United States Patent [19]
Underwood

[11] Patent Number: 5,463,994
[45] Date of Patent: Nov. 7, 1995

[54] ENGINE CONTROL DEVICE

[76] Inventor: Lorance T. Underwood, P.O. Box 444, New Harmony, Ind. 47621

[21] Appl. No.: 205,075

[22] Filed: Mar. 3, 1994

[51] Int. Cl.$^6$ .................................................. F02D 7/00
[52] U.S. Cl. ......................................................... 123/398
[58] Field of Search ................................. 123/398, 401, 123/339, 395, 396, 400, 403; 180/170

[56] References Cited

U.S. PATENT DOCUMENTS

| | | | |
|---|---|---|---|
| 2,798,468 | 7/1957 | Heidner | 123/398 |
| 2,891,417 | 6/1959 | Beegle | 123/398 |
| 3,439,783 | 4/1969 | Graham et al. | 123/398 |
| 3,605,708 | 9/1971 | Jordan | 123/398 |
| 4,159,753 | 7/1979 | Boche | 123/398 |
| 4,974,567 | 12/1990 | Jensen et al. | 123/398 |

*Primary Examiner*—Raymond A. Nelli

[57] ABSTRACT

An internal combustion engine control having a threaded rod with a disc at one end, and a rotatable arm at the other, threaded through a mounting bracket. This control mounted in the engine assembly secures the throttle at a given setting.

1 Claim, 1 Drawing Sheet

ENGINE CONTROL DEVICE

BACKGROUND OF THE INVENTION

This invention provides simple accurate engine throttle control, primarily for, but not restricted to Fairbanks Morse industrial stationary engines for oil field pump jack operations.

SUMMARY OF THE INVENTION

An engine control includes a bracket complete with mounting holes and a threaded nut secured to said bracket. The preferred embodiment is a sheet metal bracket but other embodiments obvious to those skilled in the art would serve the same purpose. The bracket is bolted onto the engine assembly. A threaded rod with a rigid disc at one end, and an unthreaded lesser diameter complete with a cotter pin hole at the other end and threaded into the bracket. A washer commonly abuts the shoulder attained by machining down the threaded rod outer diameter to a smooth lesser diameter. A swivel arm is installed over the lessor diameter to abut either the shoulder formed by machining down the threaded rod outer diameter, or to the aforesaid washer, then another washer installed, and then the parts held onto the rod, but free to rotate with a cotter pin. The engine throttle arm is positioned so that the engine is running at the proper speed, and then the swivel arm position is matched to the throttle arm by a combination of adjusting the rod, rotating the bracket, bending the bracket, and rotating the swivel. The junction of the swivel and the engine throttle is then secured with a cotter pin through the end of the said swivel arm. The locking nut secures the threaded rod in position. This invention is an improvement over the existing devices in constant speed operations.

DETAILED DESCRIPTION WITH REFERENCE TO DRAWING

Figure 1:
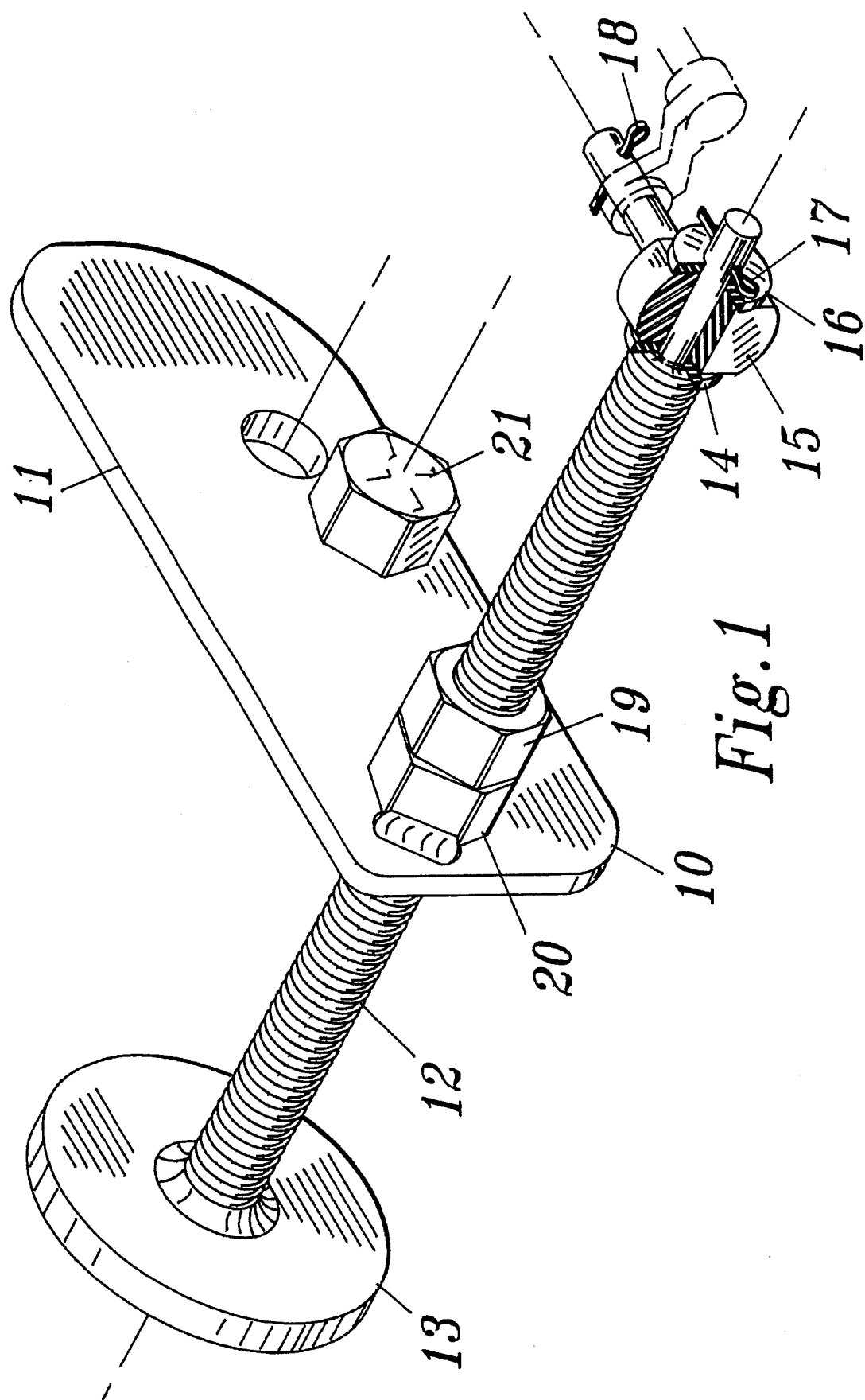
FIG. 1 is the only figure in the application and represents the only embodiment of the engine adjuster.

The governor (10), in this embodiment, consists of a bracket assembly (11), a threaded rod assembly (12), a locking nut (19), and a swivel arm (15). The bracket assembly (11), consists of a plate with a variety of mounting holes and also a hole with an adjacent nut (20), appropriately secured to the plate. The threaded rod assembly (12) is screwed through the nut (20), into the desired position and locked into place with the locking nut (19). The threaded rod assembly (12) has a disc secured to one end with the other end machined so as to provide a shaft end of lessor diameter than the threaded shaft outside diameter. This shaft and lesser diameter is over a sufficient length from the shaft and so as to permit attachment of the swivel arm (15). The swivel arm (15) in this embodiment is contained between two washers (14) and (16), with a cotter pin (17) in the shaft and hole to contain the swivel arm onto the shaft. The washers are an option and not essential to the invention. The swivel arm (15) is inserted in the throttle and the resulting junction is secured by cotter pin (18) through a hole in the swivel arm (15). The desired throttle position is obtained by adjusting as required the bracket assembly (11), the threaded rod assembly (12), or rotating the swivel arm (15). The bracket has two adjustments-it can be rotated about the mounting bolt, and/or it can be bent for the final adjustment to match the swivel arm to the ending throttle. While this invention has been illustrated by a single embodiment it is understood that modifications and substitutions can be made by one skilled in the art without departing from the spirit of the invention or the scope of the claims.

I claim:

1. An engine control device comprising in combination:

a bracket assembly with provisions for mounting to an engine and capable of holding a threaded rod with a freely rotating swivel-arm assembly;

a threaded rod assembly equipped with a turning means to provide longitudinal adjustment with respect to said bracket assembly holding the threaded rod assembly;

a means for locking said threaded rod assembly into a predetermined longitudinal position;

a swivel arm on one end of said threaded rod assembly, freely rotatable in a plane perpendicular to a central axis of said threaded rod assembly;

a means for securing said swivel-arm assembly onto said threaded rod assembly;

a means for securing a junction of said swivel-arm assembly rod to an engine throttle arm to provide control of said engine throttle arm such that the engine throttle arm can be held in a predetermined position required for a predetermined constant engine speed.

\* \* \* \* \*